United States Patent [19]
Dixon

[11] 3,721,958
[45] March 20, 1973

[54] TESTING ARRANGEMENT FOR A DATA COMMUNICATION SYSTEM

[75] Inventor: Robert P. Dixon, Rustburg, Va.

[73] Assignee: General Electric Company, Lynchburg, Va.

[22] Filed: April 30, 1971

[21] Appl. No.: 138,999

[52] U.S. Cl. ............340/146.1 BA, 178/69 L, 325/41
[51] Int. Cl. ............G08c 25/02
[58] Field of Search...340/146.1, 146.1 BA, 146.1 E; 325/2, 41, 42, 133; 178/69 H, 69 L

[56] References Cited

UNITED STATES PATENTS

| | | | |
|---|---|---|---|
| 1,923,724 | 8/1933 | Griffith | 340/146.1 |
| 2,242,196 | 5/1941 | Thompson et al. | 340/146.1 |
| 3,500,202 | 3/1970 | Zegers | 340/146.1 |
| 3,582,786 | 6/1971 | Bruglemans | 325/41 |

*Primary Examiner*—Charles E. Atkinson
*Attorney*—James Williams, Frank L. Neuhauser, Oscar B. Waddell and Joseph B. Forman

[57] ABSTRACT

The operation of a data communication system having a central transmitter and receiver and a data set transmitter and receiver, usually remotely positioned, can be tested by connecting a frequency converter between the data-set transmitter output and the data set receiver input so that signals from the central transmitter to the data set transmitter are returned by the data set receiver back to the central receiver. The data transmitted by the central transmitter can be compared with the data received by the central receiver to provide an indication of the operation of the data communication system.

3 Claims, 2 Drawing Figures

INVENTOR:
ROBERT P. DIXON,
BY James J. Williams
HIS ATTORNEY.

INVENTOR:
ROBERT P. DIXON,
BY James J. Williams
HIS ATTORNEY.

TESTING ARRANGEMENT FOR A DATA COMMUNICATION SYSTEM

BACKGROUND OF THE INVENTION

My invention relates to an improved testing arrangement for a data communication system, and particularly to such a testing arrangement that provides an overall indication of the system operation between a central data transmitter and receiver and a data set transmitter and receiver.

Large computers are provided at conveniently located centers for use by people or equipment at locations which are typically remote from the centers. Because of their large size and capability, such computers can serve a large number of people or equipment at the same time, and for this reason are called multiple-access computers. For example, such a computer may function for or with several hundred people or equipments at the same time so that a particular user of the computer may have a number of communication circuits connected to the computer. In order that such a user can make efficient use of the computer, each of the communication circuits should be reliable and in good operating condition at all times.

Accordingly, an object of my invention is to provide a new arrangement for testing the operation of a data communication system.

Another object of my invention is to provide a new arrangement for testing a data communication system, the arrangement lending itself well to being automatically tested, such as by the computer that the communication system serves.

Another object of my invention is to provide a new arrangement for a data communication system which can test each circuit of the system between a central location and the remote data set connected to the circuit, and back again.

Summary of the Invention

Briefly, these and other objects are achieved in accordance with my invention in a data communication system which, typically, has a central transmitter for transmitting data and a central receiver for receiving data. The system also has one or more remote locations, each of which has a data set transmitter connected to the central transmitter for transmitting signals from the central transmitter to a user, and a data set receiver connected to the central receiver for receiving signals from the user and transmitting these signals to the central receiver. In accordance with my invention, I provide a frequency converter having mixing means and an oscillator which produces a selected frequency. The converter is connected between the data set transmitter output and the data set receiver input and produces a frequency such that frequencies produced by the data set transmitter are converted to the appropriate frequencies and applied to the data set receiver for transmission back to the central location. Suitable comparing means are connected to the central transmitter and receiver to compare the data originally transmitted with the data received after having gone to the remote location and back. If the data received compares properly with the data transmitted, an operator or the central computer will know that that particular communication circuit is functioning properly. If the data compares unfavorably, an appropriate alarm or signal can indicate that the particular communication circuit needs attention.

BRIEF DESCRIPTION OF THE DRAWING

The subject mater which I regard as my invention is particularly pointed out and distinctly claimed in the claims. The structure and operation of my invention, together with further objects and advantages, may be better understood from the following description given in connection with the accompanying drawing, in which:

DESCRIPTION OF THE PREFERRED EMBODIMENT

Figure 1:
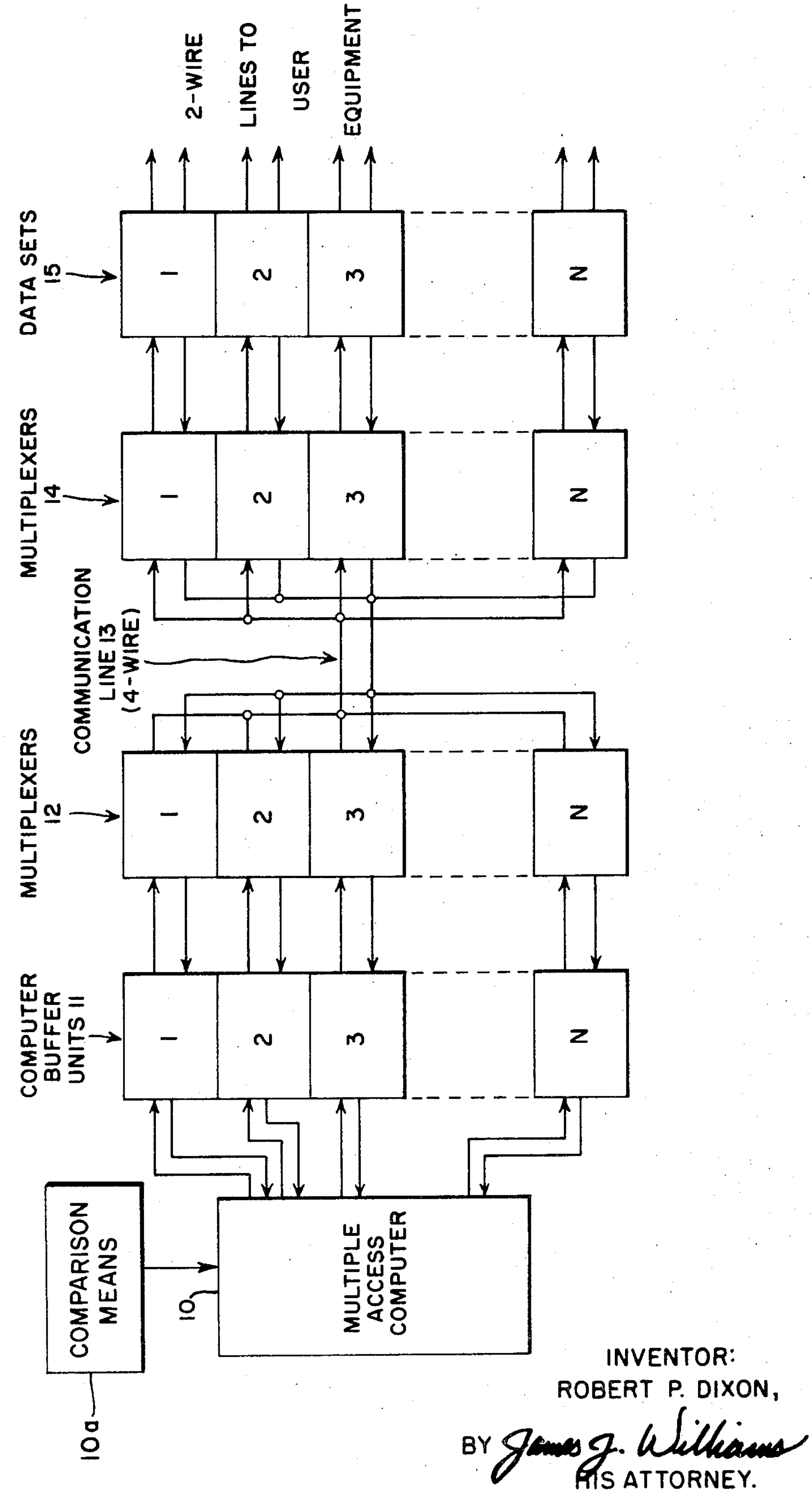
FIG. 1 shows a block diagram of one example of a data communication system with which my testing arrangement can be used.

In order to get a better understanding of the use and value of my testing arrangement, I have shown, in FIG. 1, a typical data communication system as it might be used with a multiple-access computer 10. In such a system, the computer 10 may be at a central location such as New York City, for example. Because of its large size and capability, the computer 10 can serve as many as hundreds of people or equipments at the same time. Such people or equipments may be at various locations in the United States, frequently as much as hundreds of miles from the computer 10. Some users may use the computer 10 to such an extent that they need a plurality (N) of data communication circuits so that a plurality of people or equipments can use or work with the computer 10 at the same time. Because of the distances involved between the computer 10 and the users, telephone lines and circuits are frequently used. In such arrangements, the computer 10 has each of its many sets of inputs and outputs connected to a computer buffer unit 11. Each of these buffer units 11 has a data line from the computer 10 and a data line to the computer 10, as indicated, as well as control lines (not indicated). Typically, the signals at this point are direct current, so that the lines between the computer 10 and each buffer unit 11 may also require a common or grounded line. However, this common line is omitted for clarity. Each of the buffer units 11 is respectively connected for two-way transmission to a frequency division (or other type) multiplexer 12, typically by direct current lines also. Each of the multiplexers 12 provides two-way or full duplex operation for each communication circuit or channel, so that signals from the computer 10 to a user are transmitted over the circuit at the same time that signals from the user to the computer 10 are transmitted over the same circuit. Each of the multiplexers 12 converts the direct current signals from the buffer units 11 to multiplexed signals, such as alternating current signals having frequencies which are selected to provide frequency-division multiplex transmission over a communication line 13. In the other direction, each of the multiplexers 12 selects a separate incoming alternating current signal frequency and converts that signal to direct current for a selected buffer unit 11. Thus, each of the multiplexers 12 may be considered to comprise a central transmitter and a central receiver. Typically, the communication line 13 uses a pair of balanced wires for each direction of transmission, but only one wire or line for each direction is shown in FIG. 1 for clarity. The communication line 13 may go for any distance, and may travel over various types of facilities. At the remote location, the line 13 is connected to another set of multiplexers 14 which demultiplex the signals from the computer 10 as direct current signals, and apply these signals to respective data sets 15. In the other direction, direct current signals from the respective data sets 15 are multiplexed and applied to the line 13 for transmission to the computer 10. Typically, the connections between each of the multiplexers 14 and each of the data sets 15 carry direct current data signals for each direction of transmission, as well as various direct current control signals. The data sets 15 are provided to convert the direct current operation on the side of the multiplexers 14 to two-wire operation (one pair of balanced wires carrying both directions of transmission with different frequencies for each direction) on the side of the user. This reduces the number of lines required for each data communication circuit or channel. As indicated in FIG. 1, these lines go to users or to user equipment at various locations. At the various locations, additional data sets 15 may be required or provided, depending upon the exact installation used, to convert the alternating current signals to direct current for the user terminal equipment, and convert the direct current from the terminal equipment to alternating current for transmission. In summary, the data communication system shown in FIG. 1 provides a plurality (N) of data communication circuits or channels, with each circuit being functional or operational in both directions at the same time. The system shown in FIG. 1 is known in the art, and is given by way of example to illustrate how my testing arrangement can be used.

In order that the user or customer for each of the data communication circuits shown in FIG. 1 can know that his communication circuit is properly operating, a testing arrangement is desirable. This testing arrangement should indicate that both directions of transmission on the circuit are operational and up to standard. And, of course, a large number of such circuits that a particular user may have or lease makes this testing and indicating even more desirable. In accordance with my invention, I provide a testing arrangement which can test the operation of the communication circuit from the computer to the data set 15 and back again. And, if desired, this testing can be made or performed automatically by properly programming the computer. As an example, it is assumed that data communication circuit 1 (as indicated by the block 1 in the buffer units 11, in the multiplexers 12, in the multiplexers 14, and in the data sets 15) is to be tested. This may be achieved by connecting suitable comparison means 10*a* (which may be part of the computer 10) through the computer 10 to the buffer unit 11 for circuit 1. On the user side of the data set 15 of circuit 1, a loop-back is provided so that applied test data is transmitted from the buffer unit 11 over circuit 1 to the data set 15 and received at the buffer unit 11. The data that travels over all of circuit 1 may be compared in the comparison means 10*a* with the original data. If the data so received at the computer 10 is identical with the data transmitted, then the computer or an operator will know that that particular data communication circuit 1 is operational and up to standard. If, for some reason, the data does not compare identically, then the computer or operator will have an indication of the problem involved.

Figure 2:
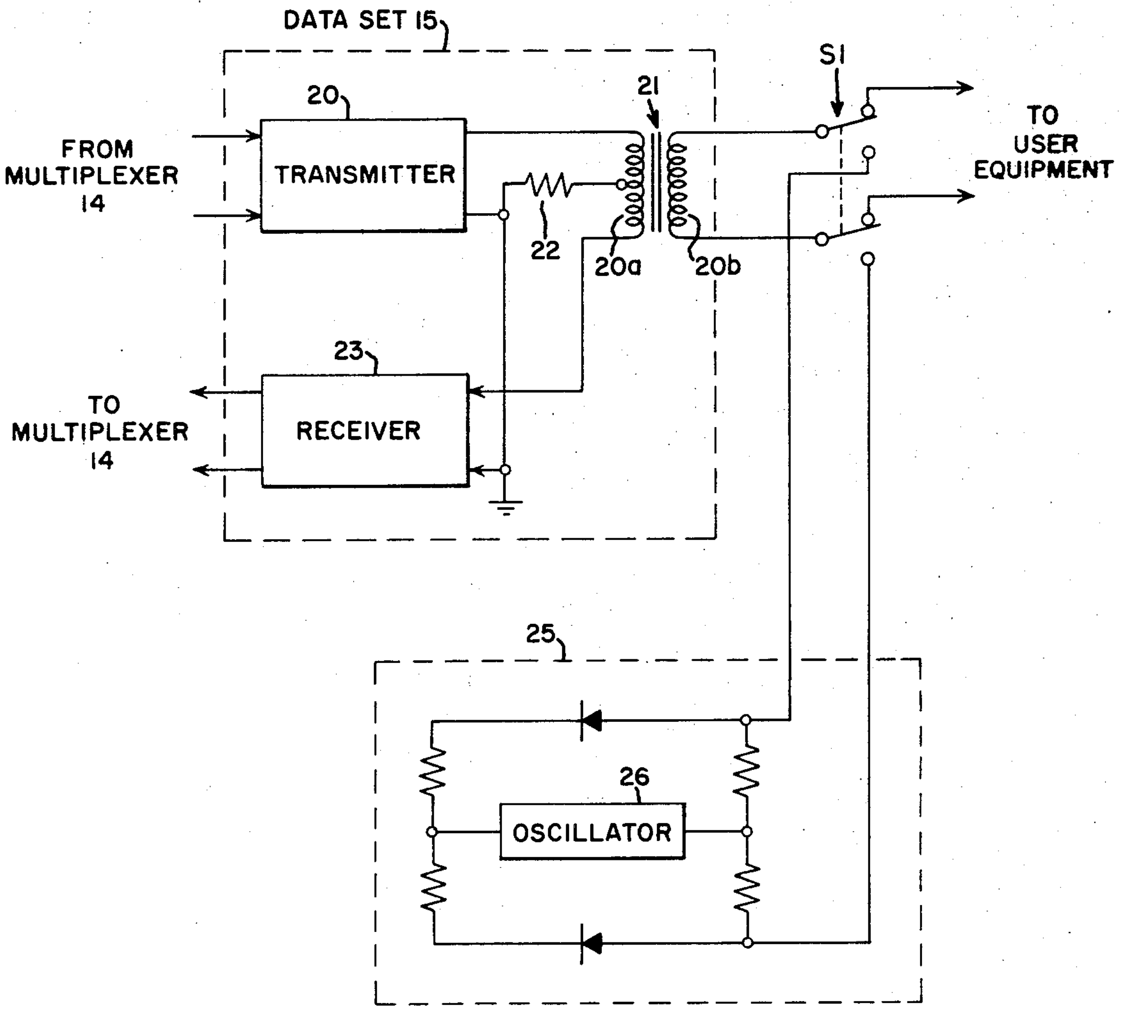
FIG. 2 shows a circuit diagram of my testing arrangement for use in a system such as shown in FIG. 1.

FIG. 2 shows how this loop-back arrangement can be provided in accordance with my invention. One of the data sets 15 is shown enclosed in dashed lines. Such a data set 15 is known in the art and includes a transmitter 20 and a receiver 23. The transmitter 20 converts direct current data signals from the multiplexer 14 to appropriate alternating current signals, and applies the signals to a hybrid coil 21 or user circuit having a center tapped first winding 20*a* and a second winding 20*b*. The center tap of the winding 20*a* is connected through a balancing resistor 22 to a point of reference potential or ground. The output of the transmitter 20 is applied across one end of the winding 20*a* and ground, and the input of the receiver 23 is connected across the other end of the winding 20*a* and ground. The line going to the user equipment is normally connected through a switch S1 across the winding 20*b*. This part of the circuit is known and operates so that signals from the user equipment are applied to the receiver 23, and signals from the transmitter 20 are applied to the user equipment line but not to the receiver 23. The switch S1 comprises a double-pole, double-throw switch which has its two movable contacts connected to the winding 20*b*. Normally, the movable contacts of the switch S1 engage their respective upper fixed contacts as shown, so as to connect the data set 15 to the line going to the user equipment. The lower set of fixed contacts of the switch S1 are connected to my testing arrangement 25 which is shown enclosed in dashed lines. My testing arrangement 25 comprises an oscillator 26 connected with a suitable resistor network and mixing diodes so as to heterodyne or mix the oscillator signals with signals on the lower contacts of the switch S1, and produce signals of the proper alternating current frequency for application to the receiver 23 and transmission back to the appropriate computer buffer unit 11.

At this point, an explanation of the frequencies used for a data communication system is appropriate. Typically, most data is indicated by direct current for a logic 0 and a logic 1, and this must be transformed to appropriate frequencies, since many telephone facilities cannot transmit direct current. A logic 0 is indicated in some terminologies as a space, and a logic 1 is indicated in the same terminology as a mark. The following table indicates what frequencies may, in a typical data set, be used to transmit and receive such data:

Table 1

| | Originating Equipment | Answering Equipment |
|---|---|---|
| Transmit Mark: | 1270 Hz | 2225 Hz |
| Transmit Space: | 1070 Hz | 2025 Hz |
| Receive Mark: | 2225 Hz | 1270 Hz |
| Receive Space: | 2025 Hz | 1070 Hz |

Persons skilled in the data communication art will recognize that if the computer originates a transmission, signals are transmitted from the computer by the data set transmitter 20 to the user at the mark and space frequencies of 1,270 and 1,070 Hertz, and signals from the user back to the computer are supplied to the data set receiver 23 at the mark and space frequencies of 2,225 and 2,025 Hertz. However, if the user originates the transmission, then he transmits at the mark and space frequencies of 1,270 and 1,070 Hertz, and signals from the computer are transmitted by the data set transmitter 20 to the user at the mark and space frequencies of 2,225 and 2,025 Hertz. Thus, a particular communication circuit should be capable of properly transmitting signals representing marks and spaces in both directions. And, my testing arrangement provides such an indication of this capability. In Table 1, which is typical, it will be seen that the mark frequencies are 200 Hertz (Δ) higher than the space frequencies. In order to provide the proper frequency conversion, my oscillator 26 would be set to oscillate at a frequency of 3,295 Hertz for the frequencies given in Table 1. If the movable contacts of the switch S1 are made to engage their lower contacts, the line to the user is disconnected, and the frequencies produced by the transmitter 20 in response to signals from the computer 10 are heterodyned or mixed with the frequency of the oscillator 26. The difference frequencies produced by this mixing are applied through the switch S1 to the data set receiver 23 for transmission back to the computer 10. Following is a table showing pertinent examples of specific frequency conversions which can be produced by my arrangement:

Table 2

| Frequency produced by transmitter **20** | Oscillator Frequency | Conversion Frequency Produced for Application to Receiver **23** |
|---|---|---|
| 1270 Hz ($f_T$) | 3295 Hz ($f_T+f_C-\Delta$) | 2025 Hz ($f_C-\Delta$) |
| 1070 Hz ($f_T-\Delta$) | 3295 Hz ($f_T+f_C-\Delta$) | 2225 Hz ($f_C$) |
| 2225 Hz ($f_T$) | 3295 Hz ($f_T+f_C-\Delta$) | 1070 Hz ($f_C-\Delta$) |
| 2025 Hz ($f_T-\Delta$) | 3295 Hz ($f_T+f_C-\Delta$) | 1270 Hz ($f_C$) |

In Table 2, it will be seen that the higher mark frequencies (1,270 and 2,225 Hertz) produced by the transmitter 20 are respectively converted to the lower space frequencies (2,025 and 1,070 Hertz); and that the lower space frequencies (1,070 and 2,025 Hertz) are respectively converted to the higher mark frequencies (2,225 and 1,270 Hertz). If an electronic comparison is made of the data or information transmitted to the test arrangement 25 and the data or information received from the test arrangement 25, this mark-space reversal can be taken into consideration by the electronic equipment. Or, if a human comparison is to be made, the data or information received can be inverted electronically and the comparison then made. This comparison can be made in various ways, such as with a transmitted printed text and a received printed text. In Table 2, I have also designated the frequencies in a general way, so that it will be understood that my invention can be used for frequencies other than the specific ones enumerated. Thus, the frequencies produced by the transmitter 20 may be designated $f_T$ and $f_T-\Delta$; the oscillator frequency may be designated $f_T+f_C-\Delta$; and the conversion frequencies for application to the receiver 23 may be designated $f_C$ and $f_C-\Delta$.

Persons skilled in the art will appreciate that the computer 10 can be programmed to provide this test from the computer location, and provide the test and comparison for all of the data communication circuits or channels in the system. The comparison means 10a may be separate, and may be connected to the computer 10 as shown, or to the buffer units 11 or the multiplexers 12. The test should, of course, use all relevant types of signals in both directions so that a complete test will be made of the communication circuit. Again, this is a matter of preference. While I have shown only one embodiment of my invention, persons skilled in the art will appreciate that modifications may be made. For example, various types of circuits may be used in the oscillator 26 shown in FIG. 2, and various types of mixing arrangements may also be provided. I prefer the switching arrangement utilizing the switch S1, although other arrangements may be provided. The switch S1 may be controlled at the location of the data set 15, or may be operated remotely from the computer location. This remote operation may be effected manually or by a program, such as with a long mark signal, or a long space signal, or some other distinguishing code signal, which when detected by the data set 15 causes the switch S1 to switch. After the test, another signal can cause the switch S1 to return to its normal condition. This test arrangement tests the circuit to the data sets 15 and back. Persons skilled in the art will understand that the data sets 15 may have various locations in the circuit, depending upon the type of circuit being used. Therefore, while my invention has been described with reference to a particular embodiment, it is to be understood that modifications may be made without departing from the spirit of the invention or from the scope of the claims.

What I claim as new and desire to secure by U. S. Letters Patent is:

1. An improved arrangement for testing the operation of a data communication circuit having a central transmitter for transmitting data and a central receiver for receiving data; having a data set transmitter connected to said central transmitter for producing two frequencies $f_T$ and $f_T-\Delta$ at an output in response to data from said central transmitter; having a data set receiver connected to said central receiver for transmitting data to said central receiver in response to two frequencies $f_C$ and $f_C-\Delta$ at an input; and having a data set user circuit for connecting said data set transmitter output and said data set receiver input to a user line; said improved arrangement comprising:

a. a frequency converter circuit having mixing means and an oscillator that produces a frequency $f_T + f_C-\Delta$;

b. means for selectively disconnecting said user line from said data set user circuit and connecting said frequency converter circuit to said data set user circuit so that said data set receiver is provided with the frequencies $f_C$ and $f_C-\Delta$ in response to said data set transmitter producing the frequencies $f_T-\Delta$ and $f_T$ respectively;

c. and means adapted to be connected to said central transmitter and receiver for comparing the data transmitted by said central transmitter with the data received by said central receiver after being transmitted through said data set transmitter and said data set receiver.

2. The improved testing arrangement of claim 1, wherein said means for selectively disconnecting said user line and connecting said frequency converter circuit can be operated remotely.

3. The improved testing arrangement of claim 1 wherein said comparison means are connected to the data input side of said central transmitter and to the data output side of said central receiver so that the comparison is made on the basis of the data itself.

* * * * *